(12) United States Patent
Adler et al.

(10) Patent No.: US 12,535,598 B2
(45) Date of Patent: Jan. 27, 2026

(54) SMART VEHICLE SYSTEMS AND CONTROL LOGIC FOR DYNAMIC DIGITAL RADIO SELECTION BASED ON VEHICLE LOCATION

(71) Applicant: GM GLOBAL TECHNOLOGY OPERATIONS LLC, Detroit, MI (US)

(72) Inventors: Aaron Adler, Rochester Hills, MI (US); Gregg R. Kittinger, Oakland Township, MI (US); Nahel Eshaq, Rochester, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 421 days.

(21) Appl. No.: 18/340,966

(22) Filed: Jun. 26, 2023

(65) Prior Publication Data

US 2024/0427030 A1 Dec. 26, 2024

(51) Int. Cl.
*G01S 19/46* (2010.01)

(52) U.S. Cl.
CPC .................. *G01S 19/46* (2013.01)

(58) Field of Classification Search
CPC ........ G01S 19/46; H04H 60/51; H04H 60/42; H04W 4/48; H04W 4/029; H04W 4/06; H04W 4/50; H04B 1/3822
See application file for complete search history.

(56) References Cited

U.S. PATENT DOCUMENTS

| | | | |
|---|---|---|---|
| 8,995,947 B2 | 3/2015 | Droste | |
| 9,148,212 B2 | 9/2015 | Hibbard, Jr. | |
| 9,578,580 B1 | 2/2017 | Ishfaq | |
| 9,705,992 B2 | 7/2017 | Droste | |
| 9,716,758 B2 | 7/2017 | Droste | |
| 9,893,825 B1 * | 2/2018 | Rao | H04W 4/80 |
| 10,862,558 B1 | 12/2020 | Aminikashani | |
| 2015/0326330 A1 | 11/2015 | Talty | |
| 2015/0381297 A1 * | 12/2015 | Cepuran | H04H 60/15 455/352 |
| 2016/0309527 A1 | 10/2016 | Chen | |
| 2017/0257179 A1 | 9/2017 | Eshaq | |

(Continued)

FOREIGN PATENT DOCUMENTS

DE 102015002245 B3 5/2016

*Primary Examiner* — Fred A Casca
(74) *Attorney, Agent, or Firm* — Quinn IP Law

(57) ABSTRACT

Presented are control systems for governing analog and digital radio services in motor vehicles, methods for making/using such systems, and vehicles equipped with such systems. A method of controlling a vehicle includes an in-vehicle radio tuner receiving selections of broadcast radio stations output by analog signals and/or streaming radio stations output by digital signals. A vehicle controller retrieves a memory-stored broadcast station service (BSS) map with a service contour containing available broadcast radio stations having sufficient signal strength within a designated area. The controller receives geopositional data indicative of the host vehicle's location, and accesses a remote database to retrieve an updated BSS map that corresponds to the vehicle's location. The controller then determines if the stored BSS map corresponds to the updated BSS map; if not, the radio tuner responsively displays an updated list of available stations revised to reflect available stations contained in the updated BSS map.

20 Claims, 4 Drawing Sheets

(56) References Cited

U.S. PATENT DOCUMENTS

| | | |
|---|---|---|
| 2018/0063882 A1 | 3/2018 | Macdonald |
| 2020/0374766 A1 | 11/2020 | Veloso et al. |
| 2021/0122312 A1 | 4/2021 | Aminikashani |

* cited by examiner

SMART VEHICLE SYSTEMS AND CONTROL LOGIC FOR DYNAMIC DIGITAL RADIO SELECTION BASED ON VEHICLE LOCATION

INTRODUCTION

The present disclosure relates generally to wireless communication systems for motor vehicles. More specifically, aspects of this disclosure relate to systems and methods for arbitrating between digital radio services and analog radio services in moving vehicles.

Current production motor vehicles, such as the modern-day automobile, are equipped with a network of onboard controllers and wireless communications devices that enable a variety of vehicle services, such as navigation assistance, cellular connectivity, and multimedia entertainment. To provide occupants with telecommunications and informatics functionality, for example, many vehicle passenger compartments are now furnished with a center-stack telematics unit that operates as both a human-machine interface (HMI) and an in-vehicle computing device for vehicle occupants. The telematics unit may wirelessly connect to a cellular network and a satellite service for such purposes as real-time navigation, customer support, vehicle diagnostics, traffic data, and digital "streaming" radio. In general, the telematics unit functions as a bidirectional radio transceiver that is able to simultaneously transmit and receive data in the form of network data packets. Data packets may be transmitted via ultra-high frequency (UHF), super-high frequency (SHF), and/or extremely-high frequency (EHF) radio signals from a cell tower to a cellular-enabled vehicle via downlink (or download) transmission and, conversely, may be transmitted via uplink (or upload) transmission from the vehicle to a cell tower. In addition to cellular communications, many telematics units are also able to exchange data over radio-frequency (RF) channels that provide analog "broadcast" radio stations.

SUMMARY

Presented herein are smart vehicle systems with control logic for arbitrating between analog radio services and digital radio services in moving vehicles, methods for operating and for making such systems, and wireless-enabled vehicles with resident telematics units provisioning dynamic digital radio selection based on vehicle location. By way of non-limiting example, systems and methods are presented for dynamically updating a memory-stored list of available broadcast radio station channels based on a subject "host" vehicle's real-time geolocation coordinates and a publicly-disseminated broadcast service map (e.g., FCC AM/FM radio station contour map) that coincides with those coordinates. By retrieving the broadcast service map that corresponds to the host vehicle's current location, e.g., from a publicly accessible Internet database, the telematics unit may overwrite the map presently in resident cache memory, update the telematics unit's available broadcast radio stations, and indicate to a vehicle driver, owner, or occupant (collectively "user") those stations that are now available at the vehicle's current location. In tandem, the telematics unit's GPS/cellular-based digital radio connectivity may be adapted to replicate a traditional AM/FM tuner to output broadcast radio to the user. In so doing, the vehicle's infotainment system may employ digital radio services to supplement or substitute broadcast radio services when AM/FM radio signals fade or fail.

Analog-type "broadcast" radio encompasses traditional radio formats that use radio-wave frequency modulation (FM) and amplitude modulation (AM) to encode an audio signal within a carrier wave. Digital-type "streaming" radio, in contrast, is a relatively new technology encompassing wireless formats that use digital audio coding to process, digitize, and compress an audio signal into a digital signal that is transmitted using a digital modulation scheme. Generally speaking, a conventional analog radio cannot transmit or receive a digital signal; however, herein described cellular-enabled telematics units are compatible with both streaming and broadcast radio. To provision both digital and analog radio services, the vehicle's internet radio station solution may use the telematics unit's assigned internet protocol (IP) address and the vehicle's GPS-borne geolocation data to optimize accurate and timely station identification for improved radio services. To provision accurate and up-to-date station solutions for moving vehicles, the telematics unit dynamically compares a telematics-stored list of available broadcast radio channels with an FCC AM/FM radio station contour map; if the vehicle geolocation coordinates are inside the perimeter of the map, the stations associated with that map contour may be made available to the user. Comparing the vehicle's current location to a corresponding segment of the contour map may also enable dynamic station selection as the user is driving the host vehicle.

Attendant benefits for at least some of the disclosed concepts include smart vehicle systems and control logic that provision controller-automated reconciliation between digital radio services and analog radio services in moving vehicles. These features may eliminate the need for separate analog radio hardware and software, such as AM/FM tuners, antennas, wiring, antenna amplifiers/filters, connectors, coax connections, brackets, etc. Doing so offers significant per-vehicle cost savings and reduced gross vehicle weight (GVW). Dynamic digital radio selection capabilities may also provide the vehicle with a higher level of electromagnetic compatibility (EMC) emissions by eliminating a dedicated AM/FM antenna from the vehicle build. In addition, disclosed systems and methods may provide a backup medium for live AM/FM radio broadcast streams using digital radio services if the analog radio signal is inadequate or unavailable.

Aspects of this disclosure are directed to vehicle control protocols, system control logic, and memory-stored instructions for governing analog and digital radio services in motor vehicles. In an example, a method is presented for controlling operation of a host vehicle, which has a resident or remote memory device, a wireless-enabled radio tuner (e.g., telematics unit with separate or built-in analog AM/FM receiver) and a resident or remote controller or module or network of controllers/modules (collectively "controller"). This representative method includes, in any order and in any combination with any of the above and below disclosed options and features: receiving, e.g., via a tuner dial, button panel, piggyback link, or touchscreen display of the radio tuner, one or more selections of broadcast radio stations that are output by analog signals and/or streaming radio stations that are output by digital signals; retrieving, e.g., via the controller from the memory device prior to or after receiving a station selection, a stored broadcast station service (BSS) map that delineates one or more service contours, each of which contains one or more available broadcast radio stations having sufficient signal strength within a respective geographic area; receiving, e.g., via the vehicle controller from a cellular or satellite network, geopositional data indicative of the host vehicle's location; retrieving, e.g., via the vehicle controller from a remote database (e.g., internet website, cloud computing service, vehicle back-office (BO) service, etc.), an updated BSS map that corresponds to the vehicle's location; determining, e.g., via the vehicle controller, if the BSS map stored in the memory device of the host vehicle corresponds to the updated BSS map retrieved from the remote database (e.g., same service contours with same available stations); and, if not, responsively transmitting, e.g., via the controller to the radio tuner, a first "update" command to display an updated list of available stations revised to reflect the available broadcast stations contained in the updated BSS map (i.e., adding newly available stations and removing now unavailable stations).

Aspects of this disclosure are also directed to computer-readable media (CRM) for provisioning dynamic radio service selection based on vehicle location. In an example, non-transitory CRM store instructions that are executable by a host vehicle's controller and/or radio tuner. When executed, these instructions cause the vehicle controller/radio tuner to perform operations, including: receiving a station selection of a broadcast radio station output by an analog signal and/or a streaming radio station output by a digital signal; retrieving, from a memory device, a stored broadcast station service map with a service contour containing an available broadcast radio station having sufficient signal strength within a designated area; receiving geopositional data indicative of a vehicle location of the host vehicle; retrieving, from a remote database, an updated BSS map corresponding to the vehicle location; determining if the stored BSS map corresponds to the updated BSS map; and displaying, via the radio tuner responsive to the stored BSS map not corresponding to the updated BSS map, an updated list of available stations revised to reflect available broadcast stations contained in the updated BSS map.

Additional aspects of this disclosure are directed to wireless-enabled vehicles with dynamic radio service selection capabilities. As used herein, the terms "vehicle" and "motor vehicle"—including permutations thereof—may be used interchangeably and synonymously to reference any relevant vehicle platform, such as passenger vehicles (ICE, HEV, FEV, fuel cell, fully and partially autonomous, etc.), commercial vehicles, industrial vehicles, tracked vehicles, off-road and all-terrain vehicles, motorcycles, farm equipment, watercraft, aircraft, etc. In an example, a motor vehicle includes a vehicle body with a passenger compartment, multiple road wheels mounted to the vehicle body (e.g., via corner modules operatively coupled to a unibody or body-on-frame chassis), and other standard original equipment. A vehicle powertrain with a prime mover (e.g., internal combustion engine (ICE) and/or electric traction motor) is attached to the vehicle body and operable to drive one or more of the road wheels to thereby propel the vehicle. Located inside the vehicle passenger compartment is a wireless-enabled radio tuner that is operable to receive selections of and, once selected, audibly output analog-based broadcast radio stations and/or digital-based streaming radio stations.

Continuing with the preceding discussion, the motor vehicle is also equipped with a vehicle controller (e.g., telematics unit control module or vehicle master control unit) that is programmed to access a resident or remote memory device to retrieve a stored BSS map with one or more service contours each containing one or more available broadcast radio stations having sufficient signal strength within a respective geographic area. The controller also receives geopositional data indicative of the subject vehicle's location, and accesses a remote database to retrieve an updated BSS map that corresponds to the vehicle's location. Once received, the controller determines whether or not the stored BSS map corresponds to the updated BSS map (e.g., substantially similar or identical); if not, the controller responsively commands the radio tuner to display an updated list of available stations revised to reflect available stations contained in the updated BSS map.

For any of the disclosed vehicles, methods, and CRM, the vehicle controller may respond to the stored BSS map not corresponding to the updated BSS map by transmitting a second "overwrite" command to the memory device to replace the stored BSS map with the updated BSS map. As another option, the vehicle controller—after determining that the stored BSS map does not correspond to the updated BSS map—may receive a confirmation input from a user of the host vehicle approving the overwriting of the memory-stored BSS map; in this instance, the overwrite command is transmitted to the memory device further in response to receipt of the user's confirmation input. As a further option, the controller may receive a user-input seek request to search for or select a new broadcast radio station; in this instance, the overwrite command is transmitted to the memory device further in response to receipt of the user's seek request.

For any of the disclosed vehicles, methods, and CRM, the vehicle controller may receive new geopositional data indicative of a new location of the host vehicle. In this instance, the vehicle controller may determine if the new vehicle location is outside a geographic area delimited by an updated service contour on the updated BSS map; if so, the vehicle controller may responsively transmit a third "broadcast" command to the radio tuner to continue outputting the selected broadcast radio station while the host vehicle is located outside the updated service contour (e.g., with user approval). For at least some applications, each BSS map includes a respective Federal Communications Commission (FCC) AM/FM radio station contour map; in this instance, the radio station contour maps may be retrieved from a publicly accessible page on the FCC website. As a further option, the memory-stored BSS map may correspond to a real-time location of the host vehicle and the updated BSS map may be an updated version of the stored BSS map. Alternatively, the memory-stored BSS map may correspond to a prior vehicle location of the host vehicle and the updated BSS map may correspond to a real-time location of the host vehicle.

For any of the disclosed vehicles, methods, and CRM, the wireless-enabled radio tuner includes two distinct hardware components: a telematics unit and an AM/FM receiver unit, both of which are mounted inside the vehicle passenger compartment. In this instance, the telematics unit receives digital signals for streaming radio, and the AM/FM receiver unit receives analog signals for broadcast radio. The vehicle controller may determine if the AM/FM receiver unit is available, e.g., present in the vehicle, functioning properly, and/or presently in a powered-on state. If an AM/FM receiver is not available, the vehicle controller may responsively command the telematics unit to output the selected broadcast radio station using digital channels. If an AM/FM receiver is available, the vehicle controller may responsively determine if the analog radio signal for the selected broadcast radio station is at or above a predefined link quality threshold. If it is, the vehicle controller may responsively command to the AM/FM receiver to output the selected broadcast radio station.

For any of the disclosed vehicles, methods, and CRM, the wireless-enabled radio tuner may be a single, integrated device, such as a telematics unit that is located inside the vehicle passenger compartment, contains the vehicle controller, and receives station selections, analog signals, and digital signals. In this instance, the vehicle controller may determine if the analog radio signal of a selected station is at or above a predefined link quality threshold. If not, the telematics unit may responsively receive a digital-signal data for the broadcast radio station, and output the selected broadcast radio station using the received digital signals. As another option, the vehicle controller may receive one or more user-input selections of one or more broadcast radio stations; prior to, concurrent with, or responsive to receiving a user-input selection of a broadcast radio station, the vehicle controller may establish a cellular or satellite connection for the host vehicle.

The above summary does not represent every embodiment or every aspect of the present disclosure. Rather, the foregoing summary merely provides a synopsis of some of the novel concepts and features set forth herein. The above features and advantages, and other features and attendant advantages of this disclosure, will be readily apparent from the following Detailed Description of illustrated examples and representative modes for carrying out the disclosure when taken in connection with the accompanying drawings and appended claims. Moreover, this disclosure expressly includes any and all combinations and subcombinations of the elements and features presented above and below.

Figure 1:
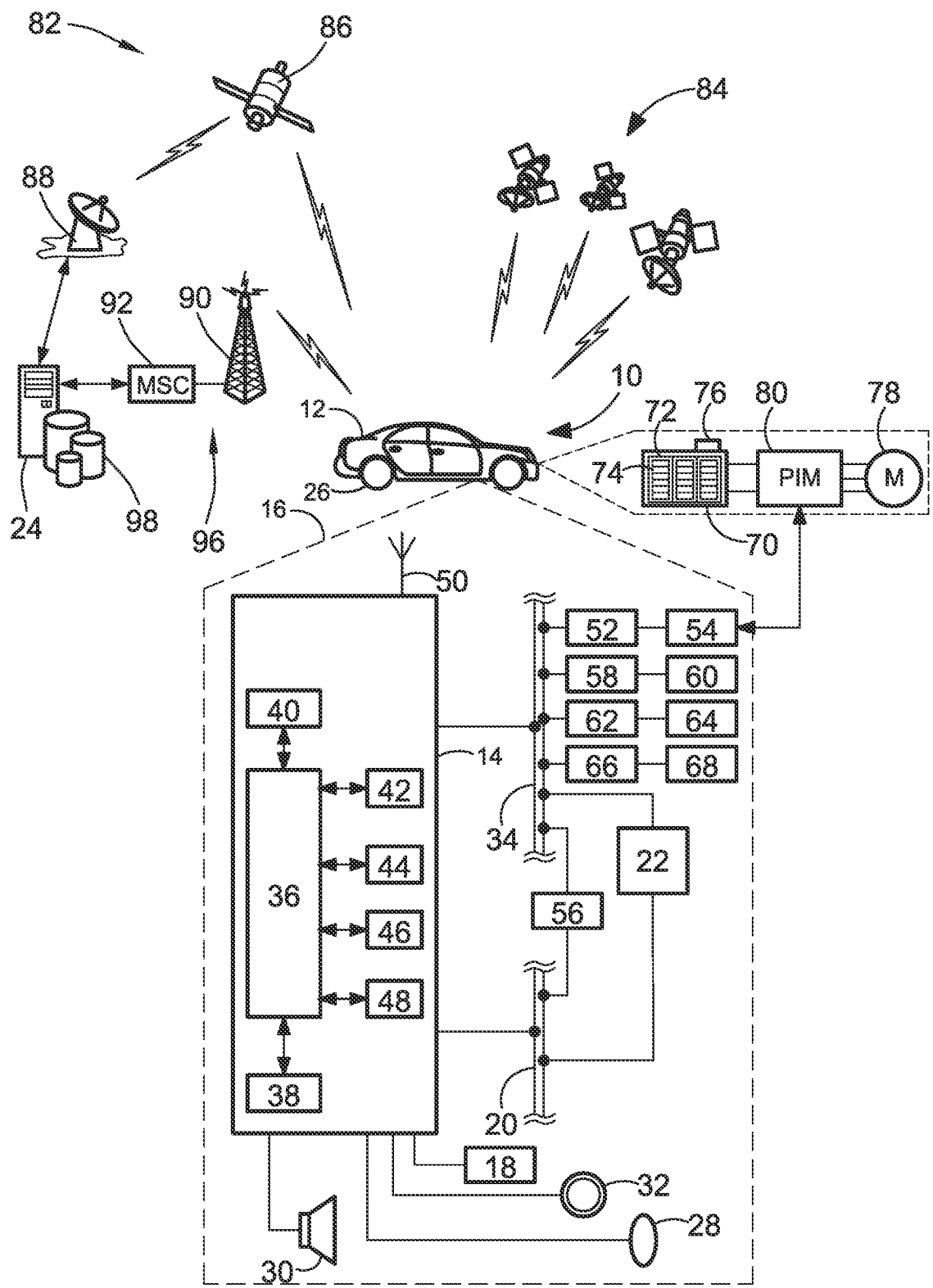
FIG. 1 is a partially schematic, side-view illustration of a representative motor vehicle with a network of in-vehicle controllers, sensing devices, and communication devices connected to a vehicle control system for arbitration between digital-based and analog-based radio services in accord with aspects of the present disclosure.

The present disclosure is amenable to various modifications and alternative forms, and some representative embodiments of the disclosure are shown by way of example in the drawings and will be described in detail herein. It should be understood, however, that the novel aspects of this disclosure are not limited to the particular forms illustrated in the above-enumerated drawings. Rather, this disclosure covers all modifications, equivalents, combinations, permutations, groupings, and alternatives falling within the scope of this disclosure as encompassed, for example, by the appended claims.

DETAILED DESCRIPTION

This disclosure is susceptible of embodiment in many different forms. Representative embodiments of the disclosure are shown in the drawings and will herein be described in detail with the understanding that these embodiments are provided as an exemplification of the disclosed principles, not limitations of the broad aspects of the disclosure. To that extent, elements and limitations that are described, for example, in the Abstract, Introduction, Summary, Description of the Drawings, and Detailed Description sections, but not explicitly set forth in the claims, should not be incorporated into the claims, singly or collectively, by implication, inference, or otherwise. Moreover, recitation of "first", "second", "third", etc., in the specification or claims is not used to establish a serial or numerical limitation; unless specifically stated otherwise, these designations may be used for ease of reference to similar features in the specification and drawings and to demarcate between similar elements in the claims.

For purposes of this Detailed Description, unless specifically disclaimed: the singular includes the plural and vice versa; the words "and" and "or" shall be both conjunctive and disjunctive; the words "any" and "all" shall both mean "any and all"; and the words "including," "containing," "comprising," "having," and the like, shall each mean "including without limitation." Moreover, words of approximation, such as "about," "almost," "substantially," "generally," "approximately," and the like, may each be used herein to denote "at, near, or nearly at," or "within 0-5% of," or "within acceptable manufacturing tolerances," or any logical combination thereof, for example. Lastly, directional adjectives and adverbs, such as fore, aft, inboard, outboard, starboard, port, vertical, horizontal, upward, downward, front, back, left, right, etc., may be with respect to a motor vehicle, such as a forward driving direction of a motor vehicle when the vehicle is operatively oriented on a horizontal driving surface.

Referring now to the drawings, wherein like reference numbers refer to like features throughout the several views, there is shown in FIG. 1 a representative motor vehicle, which is designated generally at 10 and portrayed herein for purposes of discussion as a sedan-style, electric-drive automobile. The illustrated automobile 10—also referred to herein as "motor vehicle" or "vehicle" for short—is merely an exemplary application with which aspects of this disclosure may be practiced. In the same vein, incorporation of the present concepts into the illustrated wireless communications network for provisioning broadcast and streaming radio services to connected vehicles should also be appreciated as a non-limiting implementation of disclosed features. As such, it will be understood that aspects and features of this disclosure may be applied to other wireless network architectures, implemented for assorted multimedia applications, and incorporated into any logically relevant type of vehicle. Moreover, only select components of the motor vehicles and vehicle control systems are shown and described in additional detail herein. Nevertheless, the vehicles and systems discussed below may include numerous additional and alternative features, and other available peripheral components, for carrying out the various methods and functions of this disclosure.

The representative vehicle 10 of FIG. 1 is originally equipped with a vehicle telecommunications and information ("telematics") unit 14 that wirelessly communicates, e.g., via cell towers, wireless modem, mesh network, satellite service, etc., with a remotely located back-office (BO), cloud-computing host service 24 (e.g., ONSTAR® or MYGMC®). Some of the other in-vehicle hardware components 16 shown generally in FIG. 1 include, as non-limiting examples, an electronic video display device 18, a microphone 28, audio speakers 30, and assorted user input controls 32 (e.g., buttons, knobs, switches, touchpads, joysticks, touchscreens, etc.). These hardware components 16 function, in part, as a human-machine interface (HMI) that enables a user to communicate with the telematics unit 14 and other components resident to and remote from the vehicle 10. Microphone 28, for instance, provides occupants with a means to input verbal or other audible commands; the vehicle 10 employs an embedded voice-processing unit utilizing audio filtering, editing, and analysis modules to convert the inputs to signals. Conversely, the speakers 30 provide audible output to a vehicle occupant and may be either a stand-alone speaker dedicated for use with the telematics unit 14 or may be a part of an audio system 22. The audio system 22 is operatively connected to a network connection interface 34 and an audio bus 20 to receive digital and/or analog information, rendering it as sound, via one or more speaker components.

Communicatively coupled to the telematics unit 14 is a network connection interface 34, suitable examples of which include twisted pair/fiber optic Ethernet switches, parallel/serial communications buses, local area network (LAN) interfaces, controller area network (CAN) interfaces, and the like. The network connection interface 34 enables the vehicle hardware 16 to send and receive signals with one another and with various systems both onboard and off-board the vehicle body 12. This allows the vehicle 10 to automate assorted vehicle functions, such as modulating powertrain output, activating friction or regenerative brakes, controlling vehicle steering, managing operation of a traction battery pack, controlling vehicle windows, doors, and locks, and other automated functions. For instance, telematics unit 14 may exchange signals with a Powertrain Control Module (PCM) 52, an Advanced Driver Assistance System (ADAS) module 54, an Electronic Battery Control Module (EBCM) 56, a Steering Control Module (SCM) 58, a Brake System Control Module (BSCM) 60, and assorted other vehicle ECUs, such as a transmission control module (TCM), engine control module (ECM), Sensor System Interface Module (SSIM), etc.

With continuing reference to FIG. 1, telematics unit 14 is an onboard computing device that provides a mixture of services, both individually and through its communication with other networked devices. In accord with the illustrated example, the telematics unit 14 is generally composed of one or more processors 40, each of which may be embodied as a discrete microprocessor, a multicore processor, an application specific integrated circuit (ASIC), a dedicated control module, or other suitable IC device or network of devices. Vehicle 10 may offer centralized vehicle control via a central processing unit (CPU) 36, which may be in the nature of a telematics unit-integrated control module (as shown) or a discrete vehicle master control unit (MCU). The CPU 36 may be operatively coupled to a real-time clock (RTC) 42 and one or more electronic memory devices 38, each of which may take on the form of a CD-ROM, magnetic disk, IC memory device, solid-state drive (SSD) memory, hard-disk drive (HDD) memory, flash memory, semiconductor memory (e.g., various types of RAM or ROM), etc.

Long-range communication (LRC) capabilities with remotely located off-board devices may be provided via one or more or all of a cellular chipset, an ultra-high frequency radio transceiver, a satellite-communication (SATCOM) component (e.g., global positioning system (GPS) transceiver), and/or a wireless modem, all of which are collectively represented at 44 in FIG. 1. Short-range communication (SRC) capabilities may be provided via a close-range communication device 46 (e.g., a BLUETOOTH® unit or near field communications (NFC) transceiver), UWB or LPWAN communication (comm) device, a dedicated short-range communications (DSRC) component 48, and/or a dual antenna 50. The communications devices described above may provision data exchanges as part of a periodic broadcast in a vehicle-to-vehicle (V2V) communications network or a vehicle-to-everything (V2X) communications network, e.g., Vehicle-to-Infrastructure (V2I), Vehicle-to-Pedestrian (V2P), Vehicle-to-Device (V2D), etc. It is envisioned that the vehicle 10 may be implemented without one or more of the above listed components or, optionally, may include additional components and functionality as desired for a particular end use.

CPU 36 receives sensor data from one or more sensing devices that use, for example, image detection, radar, laser, ultrasonic, optical, infrared, or other suitable technology, including short-range communications technologies (e.g., DSRC, ad-hoc mesh LAN, BLUETOOTH® or BLE®) or Ultra-Wide Band (UWB) radio technologies, e.g., for executing an automated vehicle operation or a vehicle navigation service. In accord with the illustrated example, the automobile 10 may be equipped with one or more digital cameras 62, one or more range sensors 64, one or more vehicle speed sensors 66, one or more vehicle dynamics sensors 68, and any requisite filtering, classification, fusion, and analysis hardware and software for processing raw sensor data. The type, placement, number, and interoperability of the distributed array of in-vehicle sensors may be adapted, singly or collectively, to a given vehicle platform for achieving a desired level of automation and concomitant autonomous vehicle operation.

To propel the motor vehicle 10, an electrified powertrain is operable to generate and deliver tractive torque to one or more of the vehicle's drive wheels 26. The vehicle's electrified powertrain is generally represented in FIG. 1 by an electric traction motor 78 that is operatively connected to a rechargeable energy storage system (RESS), which may be in the nature of a chassis-mounted traction battery pack 70. The traction battery pack 70 may be generally composed of one or more battery modules 72 each containing a group of electrochemical battery cells 74, such as lithium ion, lithium polymer, or nickel metal hydride battery cells. Traction motor/generator (M) unit 78 draws electrical power from and, optionally, delivers electrical power to the battery pack 70. A power inverter module (PIM) 80 electrically connects the battery pack 70 to the motor/generator unit(s) 78 and modulates the transfer of electrical current therebetween. The battery pack 70 may be configured such that module management, cell sensing, and module-to-module or module-to-host communications functionality is integrated directly into each module 72 and performed wirelessly via a wireless-enabled cell monitoring unit (CMU) 76.

Also shown in FIG. 1 is a mobile vehicle communications (MVC) system 82 that enables wireless communications between remotely located computing nodes and one or more motor vehicles 10. MVC system 82 is represented herein by a constellation of GPS satellites 84, a wireless services satellite 86, an uplink transmitting station 88, a cellular (cell) transceiver tower 90, and a mobile switching center (MSC) 92. A host vehicle's GPS transceiver 44 may exchange radio signals with the GPS satellites 84 to derive real-time or near real-time geopositional and time data for the vehicle 10, which may be used to provide navigation and other related services to vehicle occupants. Wireless services satellite 86, through cooperative operation with the uplink transmitting station 88, provisions unidirectional and bidirectional communications with the vehicle 10, such as streaming radio and Internet services (e.g., music, news, videos, etc.) and satellite telephony services (e.g., to contact a remote vehicle BO services provider). While shown with a single vehicle 10 communicating with multiple GPS satellites 84, a single wireless services satellite 86, a single uplink station 88, a single cell tower 90, and a single MSC 92, MVC system 82 may incorporate any number and combination of the foregoing elements as well as other available and hereafter developed communications hardware.

The MVC system 82 may operate within a cellular communications system 96, which is represented in FIG. 1 by one or more cell towers 90, one or more mobile switching centers 92, as well as any other networking components needed to link the cellular communications system 96 with assorted end nodes (e.g., BO host service 24). Each cell tower 90 may be equipped with a respective set of sending and receiving antennas for exchanging radio signals with vehicles 10. Base stations of the different cell towers may be connected to the MSC 92 either directly or via intermediary equipment, such as a base station controller (not shown). The cellular communications system 96 may implement any suitable communications technology, including earlier cellular protocols, such as cellular digital packet data (CDPD) 2G technologies, or contemporary cellular protocols, such as 4G-LTE of 5G-Advanced technologies. Vehicle telematics unit 14 may function as a cellular-enabled mobile component that is registered with a cellular carrier to transmit network data packets to and from the cellular communications system 96. It should be appreciated that the system 96 may take on innumerable tower/station/MSC arrangements, including co-location of a base station and a cell tower at the same site, remotely locating base stations and cell towers from one another, a single base station servicing a single cell tower, a single cell servicing multiple cell towers, and coupling multiple base stations to a single MSC, to name but a few possible arrangements.

During operation of a subject "host" vehicle, such as automobile 10 of FIG. 1, a vehicle driver, owner, or occupant (collectively "user") may wish to listen to an analog-based "broadcast" radio station, which may be disseminated from a privately owned radio mast, or a digital-based "streaming" radio station, which may be disseminated from the Internet via cellular or satellite connectivity. Prior to, contemporaneous with, or after user selection of a radio station, a vehicle controller may check to see if the host vehicle has an existing cellular or WiFi connection; if none exists, the vehicle may continually attempt to secure a connection and, if none is available, wait for connection to become enabled. In tandem, the vehicle controller may access vehicle memory to confirm that a service contour map exists in memory. If a service contour map is not already stored in memory, the vehicle controller may enter a publicly accessible government database (e.g., FCC website) to download the latest service contour map relevant to that vehicle (e.g., FCC AM/FM radio station contour map for the United States, AM/FM maps by region, AM/FM maps by frequency, etc.). Conversely, if one does exist, the vehicle controller may compare the presently stored contour map (text file (.txt_)) with the latest available service contour map (e.g., updated daily by the FCC); if the two maps are different from each other, the vehicle may prompt the user to approve downloading the latest radio station map into vehicle memory. Upon receipt of user approval (e.g., driver selects "DOWNLOAD LATEST RADIO STATION MAP"), the vehicle may copy and save the latest service contour map into vehicle memory. If the user does not actively approve of the download, the dynamic radio selection protocol may continue with the current map.

After confirming a service contour map is saved to vehicle memory, the host vehicle may then retrieve live geopositional coordinate data from a GPS satellite provider or similarly suitable navigation service to identify a real-time or near real-time location of the host vehicle. If a GPS signal is unavailable, the vehicle may use cellular trilateration, V2X-mesh location services, piggyback GPS/cellular connectivity, etc.; if no service is available, the vehicle may wait or continually search until a GPS signal becomes available. Once retrieved, the vehicle controller may compare current GPS signal coordinates with the memory-stored broadcast service contour map and update the radio station channel list in the vehicle's infotainment system to include available broadcast radio stations inside the service contour curve that corresponds to the vehicle's current location.

With the updated radio station channel list, the vehicle may determine if the host vehicle has an available AM/FM radio tuner that is accessible to the user. Upon confirming that an AM/FM radio tuner is available, the vehicle controller may evaluate a broadcast signal level of a selected broadcast radio station to determine if the signal is above a predefined minimum link quality (e.g., at least about 30-40 decibel-microvolts per meter (dB ($\mu$V/m)) for monophonic reception, at least about 50-60 dB ($\mu$V/m) for stereophonic reception). If an AM/FM radio tuner is unavailable or the signal strength is insufficient, the vehicle's infotainment system may automatically play the selected broadcast radio station using a digital internet radio service. Before playing the broadcast radio station over the vehicle's infotainment system, the vehicle may buffer and delay the AM/FM tuner's audio output in order to synchronize the audio stream with the internet radio stream. Once synchronized, the center-stack telematics unit may use a digital internet radio stream to play the selected live radio channel over the vehicle's infotainment system.

In addition to providing dynamic radio selection capabilities, the vehicle's infotainment system may enable the user to select one or more system settings that will affect the functionality of the vehicle's audio control system. As some non-limiting examples, the user may select to: (1) maintain a selected station as active irrespective of signal quality and/or vehicle location; (2) update the service contour map and/or radio station channel list responsive to the user pressing a station scan/selection button; and (3) notify the user when a presently selection station is out of range and/or expected to be out of range. If a "KEEP CURRENT STATION ACTIVE" option is enabled by a user, and the host vehicle moves out of the service contour associated with that radio station, the vehicle may retain that radio station in the available radio station channel list. If an "ONLY UPDATE WHEN SEEK/SELECT BUTTON" option is enabled by a user, the list of available radio stations may only update with the vehicle ignition is on and in response to the user pressing a seek/scan button or selecting a particular radio station. If a "NOTIFY WHEN CURRENT STATION OUT OF RANGE" option is enabled by a user, a notification may be presented to the user when they exist a selection station's contour radius to notify them that the vehicle is out of range for that selected station and they may wish to change to a new station.

Figure 2A:
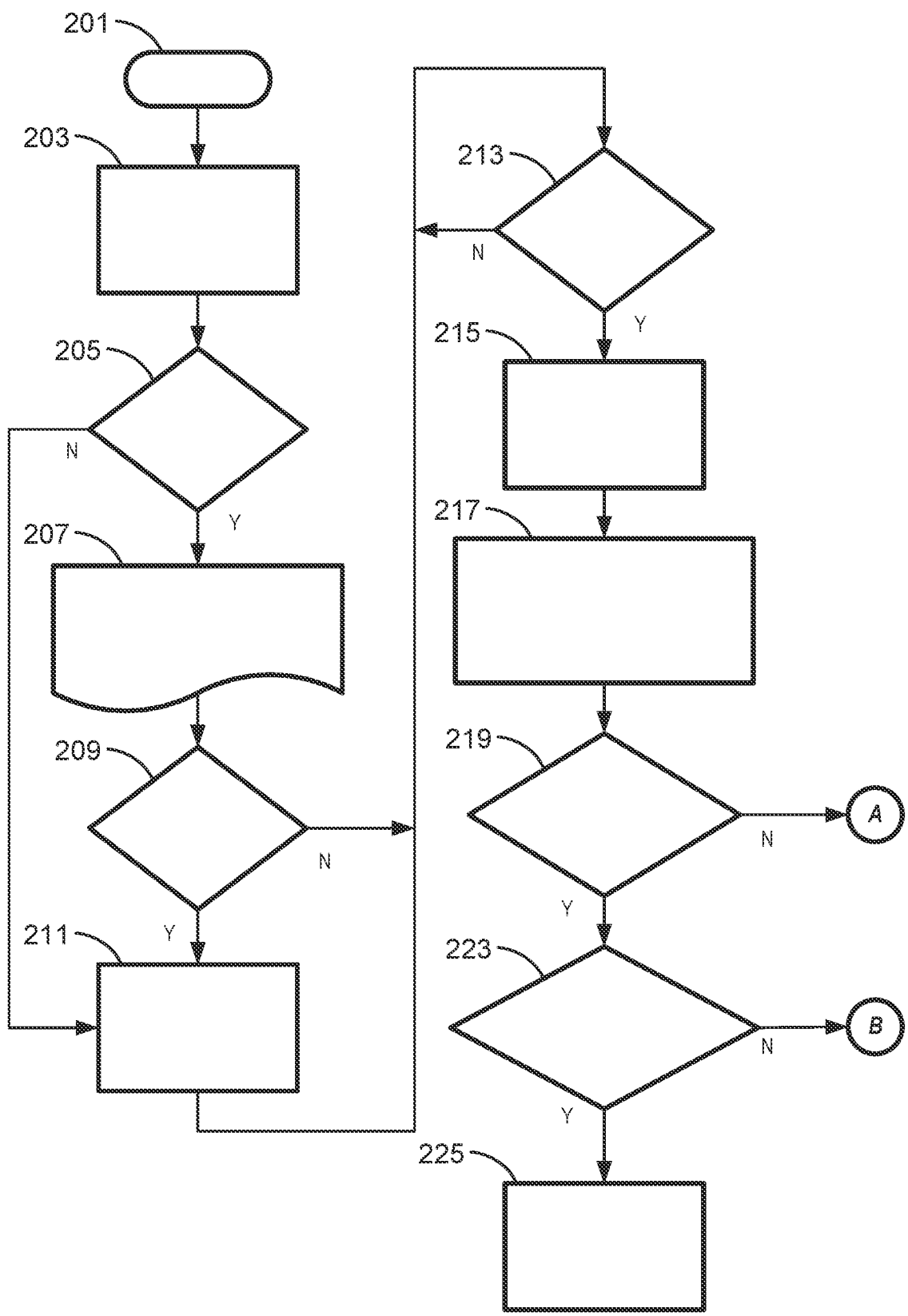
FIGS. 2A and 2B present a flowchart illustrating a representative vehicle control method for location-based, dynamic radio service selection for a host vehicle, which may correspond to memory-stored instructions that are executable by a resident or remote controller, control-logic circuit, programmable control unit, or other integrated circuit (IC) device or network of devices in accord with aspects of the disclosed concepts.
Figure 2B:
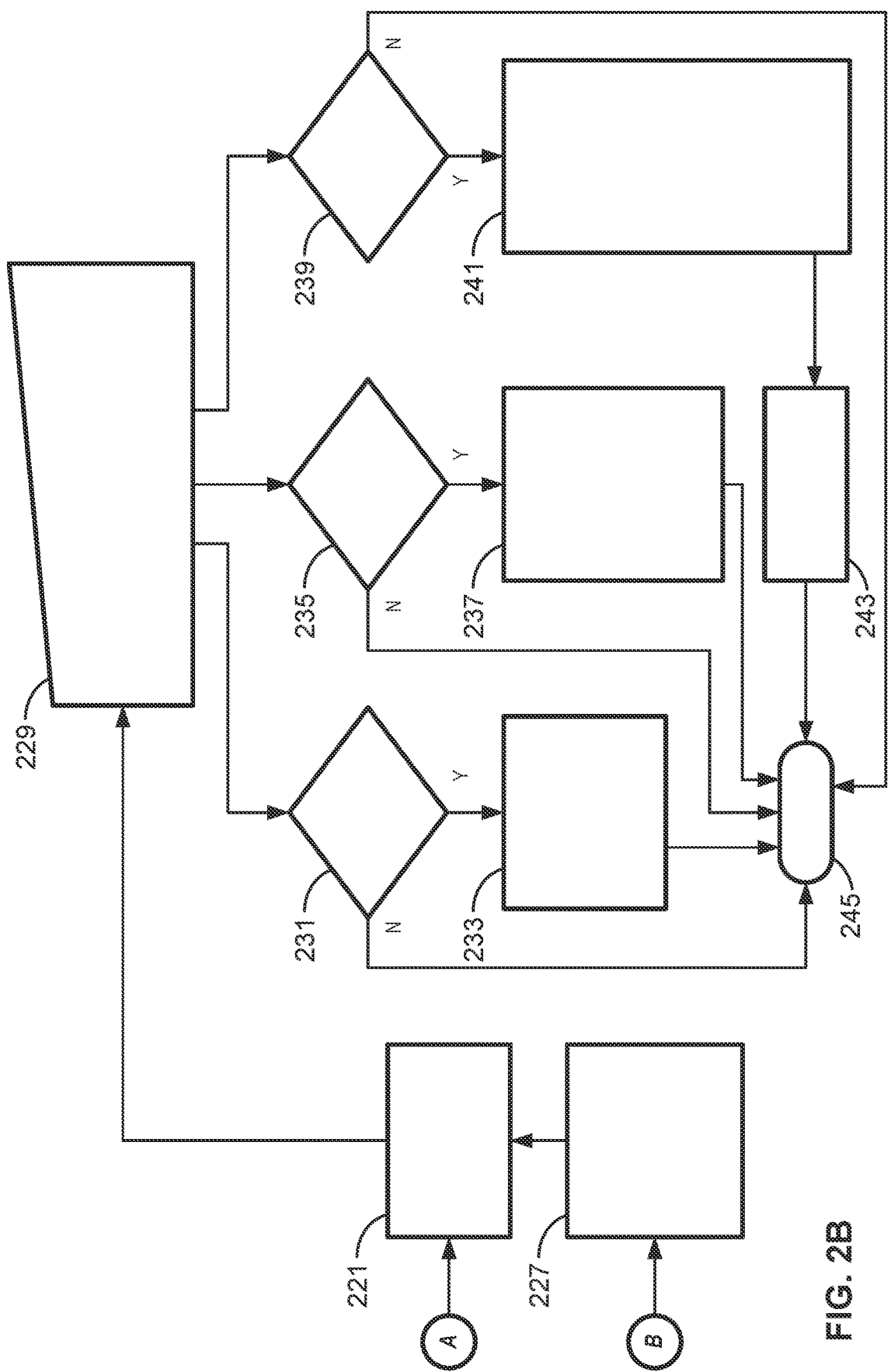

With reference next to the flow chart of FIG. 2, an improved method or control strategy for provisioning location-based, dynamic radio service selection for a host vehicle, such as automobile 10 of FIG. 1, is generally described at 200 in accordance with aspects of the present disclosure. Some or all of the operations illustrated in FIG. 2 and described in further detail below may be representative of an algorithm that corresponds to non-transitory, processor-executable instructions that are stored, for example, in main or auxiliary or remote memory (e.g., vehicle memory device 38 and/or host server database 98 of FIG. 1), and executed, for example, by an electronic controller, processing unit, dedicated control module, logic circuit, or other module or device or network of controllers/modules/devices (e.g., vehicle CPU 36 and/or BO host service 24 server of FIG. 1), to perform any or all of the above and below described functions associated with the disclosed concepts. It should be recognized that the order of execution of the illustrated operation blocks may be changed, additional operation blocks may be added, and some of the herein described operations may be modified, combined, or eliminated.

Method 200 begins at START terminal block 201 of FIG. 2 with memory-stored, processor-executable instructions for a programmable controller or control module or network of controllers/modules to call up an automated control procedure for arbitrating between digital-based and analog-based radio services. This routine may be executed in real-time, near real-time, continuously, systematically, sporadically, and/or at regular intervals, for example, each 10 or 100 milliseconds during normal operation of the motor vehicle 10. As yet another option, terminal block 201 may initialize responsive to a user command prompt (e.g., via telematics input controls 32), a resident vehicle controller prompt (e.g., from CPU 36), or a broadcast prompt signal received from a centralized backend vehicle services system (e.g., from BO host service 24). By way of non-limiting example, method 200 may automatically initialize when a driver of vehicle 10 powers-on the in-vehicle telematics unit 14. Upon completion of some or all of the control operations presented in FIG. 2, method 200 may advance to END terminal block 245 and temporarily terminate or, optionally, may loop back to terminal block 201 and run in a continuous loop.

Advancing from terminal block 201 to VEHICLE CONNECTION process block 203, method 200 executes memory-stored instructions to establish a wireless connection with a distributed computing network. By way of example, and not limitation, the CPU 36 may collaborate with LRC device(s) 44 to access a digital radio service on the World Wide Web (WWW) by securing a wireless connection with an internet service provider (ISP) via cellular link, satellite link, piggybacked personal computing device (e.g., smartphone hotspot) link, home WiFi link, etc. It may be desirable, for at least some implementations, that process block 203 be executed in response to a wireless-enabled radio tuner (e.g., telematics unit 14 and/or audio system 22) receiving a station selection of a broadcast radio station and/or a streaming radio station.

Prior to, contemporaneous with, or after the host vehicle establishes a wireless connection, method 200 executes STORED MAP decision block 205 to determine whether or not a broadcast station service (BSS) map is currently stored to vehicle memory. Unlike conventional analog radio tuners, which typically only monitor signal strengths of available radio stations, disclosed radio tuners dynamically access and evaluate contour maps stored to vehicle memory to help ensure up-to-date and uninterrupted radio services. For at least some implementations, an FCC AM/FM radio station contour map is stored in the vehicle's resident non-volatile memory (NVM), such as a Flash EEPROM. If a BSS map is not presently stored in vehicle memory (Block 205=NO), method 200 may disregard process blocks 207 and 209 and proceed directly to process block 211, which will be described in further detail below.

Figure 3A:
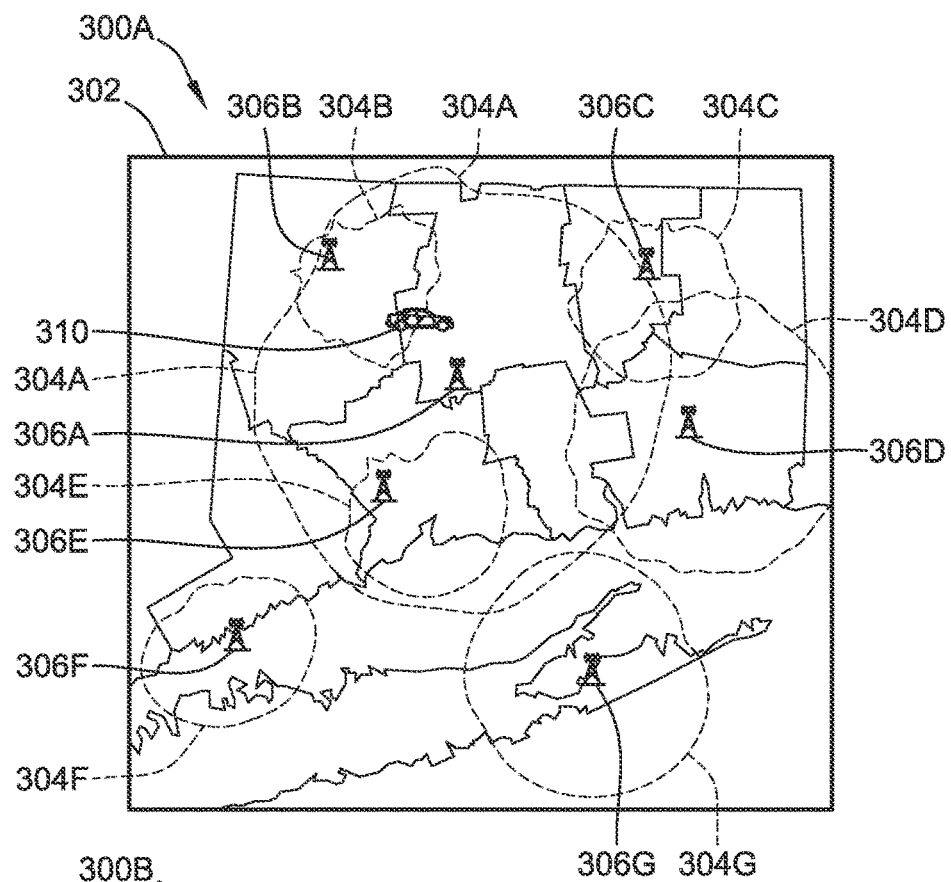
FIGS. 3A and 3B are illustrations of examples of radio service contour maps for analog-based radio stations showing a host vehicle exiting a first service contour corresponding to a first geographic area (FIG. 3A) and entering a second service contour corresponding to a second geographic area (FIG. 3B).
Figure 3B:
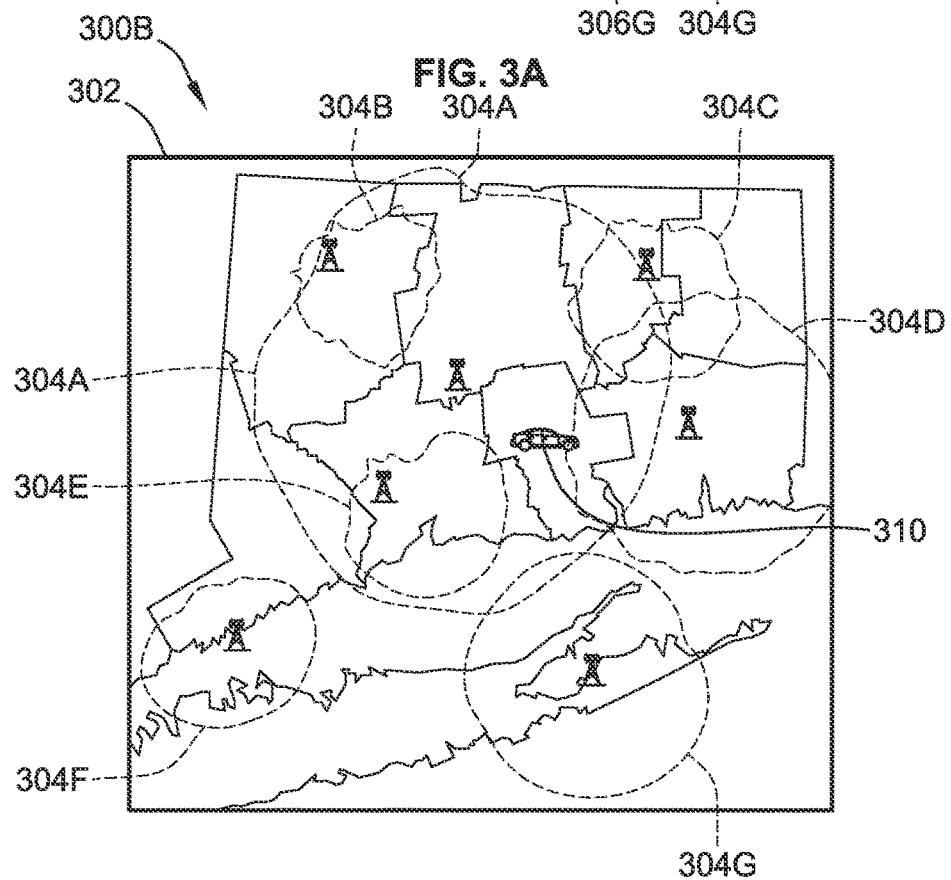

After confirming that a BSS map is presently stored in vehicle memory (Block 205=YES), method 200 proceeds to MAP COMPARISON document process block 207 to compare the BSS map file that is currently stored in vehicle memory to an updated BSS map file that is acquired from a remote database. In accord with a representative example, the CPU 36 may respond to receiving a user-input station selection from one of the input controls 32 by accessing an electronic memory device 38 to retrieve a stored BSS map. A BSS map may be in the nature of a general-purpose, cartographic map having superposed thereon one or more service contours. Each of these service contour contains one or more available broadcast radio stations that have sufficient signal strength within a designated area delimited by that contour. FIGS. 3A and 3B, for example, respectively present screenshots 300A and 300B of an in-vehicle display unit (e.g., telematics display device 18) displaying an example BSS map 302—portrayed as a portion of an FCC AM/FM radio station contour map—with discrete radio service contours 304A-304G for a corresponding number of analog-based radio stations 306A-306G. FIG. 3A shows an example host vehicle 310 exiting a first service contour 304B that delineates a first geographic area and corresponds to at least a first broadcast radio station 306B. Comparatively, FIG. 3B shows the host vehicle 310 entering a second service contour 304D that delineates a second geographic area and corresponds to at least a second broadcast radio station 306D.

After retrieving the memory-stored BSS map, document process block 307 also includes processor-executable instructions for the vehicle controller to access a remote database and retrieve therefrom an updated BSS map that corresponds to the vehicle's current location (e.g., US, Europe, Canada, etc.). As noted above, this updated BSS map may be in the nature of an FCC radio station contour map that is updated daily on and retrievable from the FCC's publicly accessibly Internet website. For a vehicle located in the United States of America (USA), the contour map may be formatted as a zipped text file that contains all FCC-protected contours for all broadcast radio stations in North America. For at least some implementations, the host vehicle's location is not needed nor used to retrieve the updated BSS map since it may be assumed that a vehicle built for sale in a particular country will necessarily retrieve the BSS map provided by that country.

Due to file size constraints, it may be desirable that the vehicle upload and store only a relevant portion of the FCC's updated radio station contour map, such as that of the state or city in which the host vehicle is presently located. It is also within the scope of this disclosure that the vehicle download and evaluate multiple segments of the FCC contour map, e.g., as selected by a vehicle driver in anticipation of a trip across state lines (e.g., driving from Detroit to Chicago). Consequently, the stored BSS map may correspond to the host vehicle's real-time location (e.g., May 2023 Michigan BSS Map) and the updated BSS map may be an updated version of the stored BSS map (e.g., June 2023 Michigan BSS Map). Alternatively, the stored BSS map may correspond to a prior location of the host vehicle or an origin location of the host vehicle (e.g., June 2023 Michigan BSS Map) and the updated BSS map may correspond a current or destination location of the host vehicle (e.g., June 2023 Illinois BSS Map).

After downloading the updated BSS map, method 200 proceeds to compare the two service contour maps to determine if the BSS map stored in vehicle memory corresponds to the updated BSS map retrieved from the remote database. If the stored BSS map and updated BSS map are substantially the same (e.g., same service contours with same available stations), method 200 may disregard process blocks 209 and 211 and proceed directly to decision block 213, which will be described in further detail below. If there are notable discrepancies between the two maps, the vehicle controller may overwrite and thereby replace the stored BSS map with the updated BSS map. For instance, the vehicle controller may determine that the stored and updated BSS maps are not substantially the same if: (1) the updated BSS map contains a new broadcast radio station proximal the host vehicle; (2) the updated BSS map omits a previously available radio station that is no longer in service; or (3) the service contour for a station changes (e.g., by at least 5%). Responsive to the stored BSS map not corresponding to the updated BSS map, the vehicle controller may execute MAP OVERWRITE storage process block 211 and automatically overwrite the presently stored BSS map with the updated BSS map, e.g., in a segment of allocated cache memory within the telematics unit's resident memory.

With continuing reference to FIG. 2, the method 200 may optionally prompt a vehicle user to approve the file overwriting procedure before replacing the BSS map stored in vehicle memory, as indicated at UPDATE APPROVAL decision block 209. As an example, after determining that the stored BSS map does not correspond to the updated BSS map, the telematics unit display device 18 may display a notification to the user notifying them of the vehicle's intent to replace the existing BSS map and a prompt to approve or deny the procedure. Using vehicle input controls 32, the user may input their approval (e.g., "OVERWRITE APPROVED") to overwrite the stored BSS map in the memory device of the host vehicle; the CPU 36 responsively commands the memory device(s) 38 to overwrite the BSS map. In another option, the vehicle CPU 36 may issue an overwrite command to a memory device 38 in response to receipt of a user-input seek request to search for and/or select a new broadcast radio station. It is also within the scope of this disclosure to omit decision block 209 from method 200. To that end, updating of the memory stored BSS map may be fully automated, thus, eliminate any requisite input or approval from a user of the host vehicle.

Advancing from process block 211 to VEHICLE LOCATION decision block 213, method 200 determines whether or not geopositional data indicative of the host vehicle's location is available for retrieval by the host vehicle. As noted above, the host vehicle may use a GPS navigation service, tower-to-tower cellular trilateration techniques, a V2X-mesh location service, a piggybacked GPS/cellular connection, etc., to ascertain the vehicle's real-time or near real-time location. If the vehicle's geopositional data cannot be retrieved, e.g., due to an unavailable GPS signal (Block 213=NO), method 200 may run in a continuous loop until the vehicle's geopositional data can be retrieved. After successfully retrieving pertinent host location data, method 200 proceeds to BSS MAP LOCATION predefined process block 215 to compare the vehicle's current location (e.g., geopositional coordinates) with the memory stored BSS map to locate the vehicle on the map and thereby identify which service contours, if any, coincide with the host vehicle's location. At STATION UPDATE data storage block 217, the method 200 may concomitantly update a memory-stored list of available stations to reflect the available broadcast stations contained in the updated BSS map that coincide with the host vehicle's current location. At the same time, the radio tuner may likewise update and display the revised list of stations. For instance, all radio stations inside the service contours of the updated (and now stored) BSS map that overlay the host's geopositional coordinates-if not already present—are stored and displayed to the user as stations available for selection. The user of the host vehicle may now be provided with the option to select a broadcast or streaming radio station.

Method 200 continues to LIVE TUNER decision block 219 to determine whether or not the host vehicle has an AM/FM tuner that is available to the user (e.g., present in the vehicle, functioning properly, and/or presently powered-on). As indicated above, the host vehicle's wireless-enabled radio tuner may be a fully integrated audio component that is generally composed of a telematics unit offering both broadcast and streaming radio services. Other form factors may include a multicomponent audio system that employs a telematics unit to offer streaming radio services and an AM/FM receiver unit to offer broadcast radio services. In either case, if the host vehicle's broadcast radio service is unavailable due to a faulty, powered-off, or missing AM/FM tuner (Block 219=NO), method 200 may automatically execute DIGITAL RADIO data output block 221 (moving across page-to-page connectors (A)) and plays the user-selected broadcast radio station over the vehicle's infotainment system using available digital radio services. This may be accomplished by connecting to a compatible internet audio service that streams a digital radio signal for the desired broadcast station.

After confirming that the host vehicle's broadcast radio service is available, e.g., via a properly functioning and powered-on AM/FM tuner (Block 219=YES), method 200 executes the memory-stored instructions associated with LINK QUALITY decision block 223 to ascertain whether or not the analog radio signal associated with the user-selected broadcast radio station is at or above a predefined link quality threshold (e.g., 60 dBμ). If the Received Signal Strength (RSS) of the incoming RF signal from the broadcast tower meets or exceeds this minimum threshold (Block 223=YES), the vehicle controller may responsively command the vehicle's AM/FM receiver to output the broadcast radio station using the corresponding analog signal and available broadcast radio services, as indicated at BROADCAST RADIO process block 225. Conversely, upon determining that the RSS is below the link quality threshold (Block 223=NO), method 200 of FIG. 2 may responsively execute a BUFFER & DELAY process block 227 (moving across page-to-page connectors (B)) and concomitantly buffer and delay the live AM/FM tuner's audio output to synchronize it with the infotainment system's audio stream. Once substantially synchronized, method 200 may execute process block 221 and play the selected broadcast radio station over the vehicle's infotainment system using available digital radio services.

Prior to or after receiving a radio station selection, method 200 may execute RADIO SETTINGS manual input block 229; this allows a user of the host vehicle to selectively calibrate one or more control settings in order to help govern operation of the vehicle's audio system. As noted above, the user may be prompted to activate or deactivate the following features: (1) maintain broadcast radio station irrespective of signal quality and/or vehicle location; (2) update stored service contour map and available radio station channel list when user presses station scan button or station selection button; and (3) notify user when selected station is out of range or is expected to become out of range. As per option (1), method 200 may execute ENABLE STATION ACTIVE decision block 231 to determine whether or not a user has enabled a current station active setting; if not (Block 231=NO), method 200 may proceed to terminal block 245 and temporarily terminate. Conversely, if the current station active setting has been enabled (Block 231=YES), the vehicle controller will monitor the user's selected station, the service contour associated with the selected station, and the vehicle location; if vehicle tracking indicates that the host vehicle is or will likely leave the service contour, the host will nevertheless continue to play the user's selected radio station, as indicated at CURRENT STATION ACTIVE process block 233. For instance, the vehicle CPU 36 may respond to a detected location of the vehicle 10 being outside a respective geographic area delimited by the service contour by commanding the telematics unit 14 to continue outputting the broadcast radio station while the host vehicle is located outside the updated service contour.

Another available example of a user-selectable audio system control setting includes the option to choose if and when the vehicle may update the stored BSS map and update the list of available broadcast radio stations. By way of example, and not limitation, method 200 may execute RESTRICT MAP UPDATE decision block 235 to determine whether or not a user has enabled the option to only update the BSS map when the user presses a seek/scan button; if not (Block 235=NO), method 200 may proceed to terminal block 245 and temporarily terminate. On the other hand, if the user chooses to limit BSS map updates (Block 235=YES), method 200 may default to retaining the memory-stored BSS map and list of available channels unless and until the user depresses the seek/scan button. When the seek/scan button is pressed, method 200 will automatically execute MAP AND CHANNEL UPDATE process block 237 and overwrite the memory stored BSS map with the updated BSS map based on the host vehicle's current geopositional location.

Method 200 may also execute SIGNAL LOSS NOTICE decision block 239 to determine whether or not a user has enabled the option to receive a notification when a presently selected broadcast radio station is out of range (e.g., RSS is below link quality threshold); if not (Block 239=NO), method 200 may proceed to terminal block 245 and temporarily terminate. If the user selects to receive a notification when the current station is out of range (Block 239=YES), method 200 may responsively execute LOST SIGNAL data output block 241 to generate and output a notification to the user (e.g., via telematics display device 18) that the now-playing broadcast radio station is outside the service contour map that corresponds to the host vehicle's current location. The notification may be accompanied with a prompt to the user to select a new radio station. At NEW STATION manual input block 243, the method 200 may receive a user-input selection of a new broadcast radio station; the method 200 responsively commands the in-vehicle radio tuner to output the newly selected station.

Aspects of this disclosure may be implemented, in some embodiments, through a computer-executable program of instructions, such as program modules, generally referred to as software applications or application programs executed by any of a controller or the controller variations described herein. Software may include, in non-limiting examples, routines, programs, objects, components, and data structures that perform particular tasks or implement particular data types. The software may form an interface to allow a computer to react according to a source of input. The software may also cooperate with other code segments to initiate a variety of tasks in response to data received in conjunction with the source of the received data. The software may be stored on any of a variety of memory media, such as CD-ROM, magnetic disk, and semiconductor memory (e.g., various types of RAM or ROM).

Moreover, aspects of the present disclosure may be practiced with a variety of computer-system and computer-network configurations, including multiprocessor systems, microprocessor-based or programmable-consumer electronics, minicomputers, mainframe computers, and the like. In addition, aspects of the present disclosure may be practiced in distributed-computing environments where tasks are performed by resident and remote-processing devices that are linked through a communications network. In a distributed-computing environment, program modules may be located in both local and remote computer-storage media including memory storage devices. Aspects of the present disclosure may therefore be implemented in connection with various hardware, software, or a combination thereof, in a computer system or other processing system.

Any of the methods described herein may include machine readable instructions for execution by: (a) a processor, (b) a controller, and/or (c) any other suitable processing device. Any algorithm, software, control logic, protocol, or method disclosed herein may be embodied as software stored on a tangible medium such as, for example, a flash memory, a solid-state drive (SSD) memory, a hard-disk drive (HDD) memory, a CD-ROM, a digital versatile disk (DVD), or other memory devices. The entire algorithm, control logic, protocol, or method, and/or parts thereof, may alternatively be executed by a device other than a controller and/or embodied in firmware or dedicated hardware in an available manner (e.g., implemented by an application specific integrated circuit (ASIC), a programmable logic device (PLD), a field programmable logic device (FPLD), discrete logic, etc.). Further, although specific algorithms may be described with reference to flowcharts and/or workflow diagrams depicted herein, many other methods for implementing the example machine-readable instructions may alternatively be used.

Aspects of the present disclosure have been described in detail with reference to the illustrated embodiments; those skilled in the art will recognize, however, that many modifications may be made thereto without departing from the scope of the present disclosure. The present disclosure is not limited to the precise construction and compositions disclosed herein; any and all modifications, changes, and variations apparent from the foregoing descriptions are within the scope of the disclosure as defined by the appended claims. Moreover, the present concepts expressly include any and all combinations and subcombinations of the preceding elements and features.

What is claimed:

1. A method of controlling operation of a host vehicle having a vehicle controller, a memory device, and a wireless-enabled radio tuner, the method comprising:

receiving, via the radio tuner, a station selection of a broadcast radio station output by an analog radio signal and/or a streaming radio station output by a digital radio signal;

retrieving, via the vehicle controller from the memory device, a stored broadcast station service (BSS) map with a service contour containing available broadcast radio stations having sufficient signal strength within a designated area;

receiving, via the vehicle controller, geopositional data indicative of a vehicle location of the host vehicle;

retrieving, via the vehicle controller from a remote database, an updated BSS map corresponding to the vehicle location;

determining, via the vehicle controller, if the stored BSS map in the memory device of the host vehicle corresponds to the updated BSS map retrieved from the remote database; and transmitting, via the vehicle controller responsive to the stored BSS map not corresponding to the updated BSS map, an update command to the radio tuner to display a list of available stations revised to reflect available broadcast stations contained in the updated BSS map.

2. The method of claim 1, further comprising transmitting, via the vehicle controller responsive to the stored BSS map not corresponding to the updated BSS map, an overwrite command to the memory device to replace the stored BSS map with the updated BSS map.

3. The method of claim 2, further comprising receiving, via the vehicle controller after determining the stored BSS map does not correspond to the updated BSS map, a confirmation input from a user of the host vehicle to overwrite the stored BSS map in the memory device of the host vehicle, wherein transmitting the overwrite command to the memory device is further in response to receipt of the confirmation input from the user of the host vehicle.

4. The method of claim 2, further comprising receiving a user-input seek request from a user of the host vehicle to search for and/or select a new broadcast radio station, wherein transmitting the overwrite command to the memory device is further in response to receipt of the seek request from the user.

5. The method of claim 1, further comprising:
receiving, via the vehicle controller, new geopositional data indicative of a new vehicle location of the host vehicle;
determining, via the vehicle controller, if the new vehicle location is outside a geographic area delimited by an updated service contour of the updated BSS map; and
transmitting, via the vehicle controller responsive to the new vehicle location being outside the geographic area, a broadcast command to the radio tuner to continue outputting the broadcast radio station while the host vehicle is located outside the updated service contour.

6. The method of claim 1, wherein the stored BSS map and the updated BSS map each includes a respective Federal Communications Commission (FCC) AM/FM radio station contour map, and wherein the remote database is in FCC website.

7. The method of claim 1, wherein the vehicle location is a real-time vehicle location and the stored BSS map either: (1) corresponds to the real-time vehicle location and the updated BSS map is an updated version of the stored BSS map; or (2) corresponds to a prior vehicle location of the host vehicle and the updated BSS map corresponds to the real-time vehicle location.

8. The method of claim 1, wherein the station selection received via the radio tuner includes a user-input selection of the broadcast radio station, the method further comprising establishing, responsive to receiving the user-input selection of the broadcast radio station, a cellular or satellite connection for the host vehicle.

9. The method of claim 1, wherein the wireless-enabled radio tuner includes a telematics unit and an AM/FM receiver unit both mounted inside a passenger compartment of the host vehicle, wherein the telematics unit is operable to receive digital radio signals, and wherein the AM/FM receiver unit is operable to receive analog radio signals.

10. The method of claim 9, further comprising:
determining, via the vehicle controller, if the AM/FM receiver unit is available, the AM/FM receiver unit being available if present, functioning, and/or powered on; and
transmitting, via the vehicle controller responsive to the AM/FM receiver not being available, a first broadcast command to the telematics unit to output the broadcast radio station.

11. The method of claim 10, further comprising:
determining, via the vehicle controller responsive to the AM/FM receiver being available, if the analog radio signal is at or above a predefined link quality threshold; and
transmitting, via the vehicle controller responsive to the analog radio signal being at or above the predefined link quality threshold, a second broadcast command to the AM/FM receiver to output the broadcast radio station.

12. The method of claim 1, wherein the wireless-enabled radio tuner includes a telematics unit mounted inside a passenger compartment of the host vehicle, containing the vehicle controller, and operable to receive the station selection, the analog radio signal, and the digital radio signal.

13. The method of claim 12, further comprising:
determining, via the vehicle controller, if the analog radio signal is at or above a predefined link quality threshold;
receiving, via the telematics unit responsive to the analog radio signal not being at or above the predefined link quality threshold, a digital signal for the broadcast radio station; and
outputting, via the telematics unit, the broadcast radio station using the received digital signal.

14. A non-transitory, computer-readable medium storing instructions executable by a vehicle controller and/or a wireless-enabled radio tuner of a host vehicle, the instructions, when executed, causing the vehicle controller and/or the radio tuner to perform operations comprising:
receiving a station selection of a broadcast radio station output by an analog signal and/or a streaming radio station output by a digital signal;
retrieving, from a memory device, a stored broadcast station service (BSS) map with a service contour containing an available broadcast radio station having sufficient signal strength within a designated area;
receiving geopositional data indicative of a vehicle location of the host vehicle;
retrieving, from a remote database, an updated BSS map corresponding to the vehicle location;
determining if the stored BSS map corresponds to the updated BSS map; and
displaying, via the radio tuner responsive to the stored BSS map not corresponding to the updated BSS map, an updated list of available stations revised to reflect available broadcast stations contained in the updated BSS map.

15. A motor vehicle, comprising:
a vehicle body;
a plurality of road wheels rotatably attached to the vehicle body;
a prime mover attached to the vehicle body and operable to drive one or more of the road wheels to thereby propel the motor vehicle;
a wireless-enabled radio tuner attached to the vehicle body and operable to receive a station selection of a broadcast radio station output by an analog radio signal and/or a streaming radio station output by a digital radio signal; and a vehicle controller programmed to:
retrieve, from a memory device, a stored broadcast station service (BSS) map with a service contour containing available broadcast radio stations having sufficient signal strength within a designated area;
receive geopositional data indicative of a vehicle location of the motor vehicle;
retrieve, from a remote database, an updated BSS map corresponding to the vehicle location;
determine if the stored BSS map corresponds to the updated BSS map; and
responsive to the stored BSS map not corresponding to the updated BSS map, command the radio tuner to display an updated list of available stations revised to reflect available broadcast stations contained in the updated BSS map.

16. The motor vehicle of claim 15, wherein the vehicle controller is further programmed to transmit, responsive to the stored BSS map not corresponding to the updated BSS map, an overwrite command to the memory device to replace the stored BSS map with the updated BSS map.

17. The motor vehicle of claim 15, wherein the vehicle controller is further programmed to:
receive new geopositional data indicative of a new vehicle location of the motor vehicle;
determine if the new vehicle location is outside a geographic area delimited by an updated service contour of the updated BSS map; and
transmit, responsive to the new vehicle location being outside the geographic area, a broadcast command to the radio tuner to continue outputting the broadcast radio station while the motor vehicle is located outside the updated service contour.

18. The motor vehicle of claim 15, wherein the station selection received via the radio tuner includes a user-input selection of the broadcast radio station, the vehicle controller being further programmed to establish a cellular or satellite connection for the host vehicle in response to receiving the user-input selection of the broadcast radio station.

19. The motor vehicle of claim 15, wherein the wireless-enabled radio tuner includes a telematics unit containing the vehicle controller and operable to receive the station selection, the analog radio signal, and the digital radio signal.

20. The motor vehicle of claim 19, wherein the vehicle controller is further programmed to:
determine if the analog radio signal is at or above a predefined link quality threshold;
responsive to the analog radio signal not being at or above the predefined link quality threshold, receive a digital signal for the broadcast radio station; and
command the telematics unit to output the broadcast radio station using the received digital signal.

* * * * *